United States Patent [19]

Moulds, III

[11] Patent Number: 5,164,647
[45] Date of Patent: Nov. 17, 1992

[54] MULTIVARIABLE ADAPTIVE VIBRATION CANCELLER

[75] Inventor: Clinton W. Moulds, III, Millersville, Md.

[73] Assignee: Westinghouse Electric Corp., Pittsburgh, Pa.

[21] Appl. No.: 632,842

[22] Filed: Dec. 24, 1990

[51] Int. Cl.⁵ ............................................. G05B 13/00
[52] U.S. Cl. .................................................... 318/561
[58] Field of Search ...................... 318/561, 640, 128; 364/158; 384/448; 248/550; 267/136

[56] References Cited

U.S. PATENT DOCUMENTS

| | | | |
|---|---|---|---|
| 3,564,221 | 9/1960 | Wheeling | 364/158 |
| 4,615,504 | 10/1986 | Sandercock | 248/550 |
| 4,626,754 | 12/1986 | Habermann et al. | 318/640 |
| 4,643,592 | 2/1987 | Lewis et al. | 384/448 X |
| 4,796,873 | 1/1989 | Schubert | 267/136 |
| 4,950,966 | 8/1990 | Moulds, III | 318/561 |

*Primary Examiner*—William M. Shoop, Jr.
*Attorney, Agent, or Firm*—J. K. Williamson

[57] ABSTRACT

A system for minimizing periodically induced vibration in a mechanical structure, particularly rotary shaft apparatus that is not limited to the use of any particular number or type of forcers or sensors and requires no knowledge of the mechanical structure's transfer function. In accordance with a preferred embodiment the system senses periodically induced vibration utilizing a plurality of sensors and produces a complex output representative of the algebraic sum of the vibrations sensed for each harmonic and counteracting the vibration with a plurality of actuators operatively coupled to the structure by producing a counteracting vibration therein in response to a complex input signal for each actuator in the form of a matrix of system responses to vibrational inputs at selected harmonics of interest. More specifically, the complex inputs for the actuators are produced on the basis of an adaptation cycle wherein the effect of an adjustment of the complex inputs on the complex outputs is utilized to determine the nature of a successive adjustment of the complex inputs utilizing a control algorithm.

14 Claims, 3 Drawing Sheets

MULTIVARIABLE ADAPTIVE VIBRATION CANCELLER

BACKGROUND OF THE INVENTION

1. Field of the Invention

The invention relates to improvements in methods and apparatuses for reducing vibration-induced noise in machinery, and in particular to a method and apparatus for actively cancelling vibrations in a structure that supports rotating machinery.

2. Prior Art

It is desirable to reduce or eliminate vibrations induced in rotating machinery. Various active and passive methods have been employed to suppress vibrations. Examples of passive methods include cushion supports and mechanical damping means which in essence absorb and dissipate the vibrational energy produced by the disturbance. Passive methods are generally unsatisfactory because the vibrational energy is ultimately transferred to the environment. This occurs because the vibrational energy contains complex wave forms which manifest themselves at various harmonics of the fundamental vibration frequency. A simple mechanical absorber or damper may thus be essentially transparent to the various components of the vibrational energy. Accordingly, such efforts to suppress, cancel or eliminate the vibrations may not be effective.

Active methods are more successful at eliminating or cancelling vibrations. However, these too have deficiencies. Like passive methods, active methods may only be operable within a narrow frequency range of the fundamental distrubance. In active systems a counteracting force is produced which opposes the force produced by the disturbance. The opposing force is not easily generated with accuracy because the nature of the disturbance is rarely completely known. The problem is further aggravated by the fact that the structure may be complex and is not amenable to a simplified rigid body analysis. Furthermore, most active systems must be custom designed for a specific structural system and/or type and postion of forcers in that the specific characteristics of the physical system as well as those of the forcers must be known. For example, U.S. Pat. No. 4,626,754 to Habermann et al. discloses a method and device for reducing the vibrations of rotating machines with an active suspension which is limited to machines which utilize electromagnetic bearings that have electromagnets arranged in pairs along fixed orthogonal diametral axes.

RELATED INVENTIONS

A method for reducing or cancelling vibration induced in rotating machinery is disclosed in the applicant's copending patent application Ser. No. 375,227, filed on Jul. 3, 1989. In this application, the teachings of which are incorporated herein by reference, unwanted vibration in the mechanical structure 10 caused by a periodic pulsating force 12 in a rotating shaft 14 can be cancelled by the arrangement illustrated in FIGS. 1A-C.

A reaction mass actuator or forcer 16, acting on the shaft 14 through a permanent magnet or electromagnet 18 applies a controlled counteractive force 20 to the shaft 14 which opposes the shaft pulsation force 12. The actuator 16 operates in response to an output of adaptive vibration canceller 22. The counteractive force 20 cancels the vibrations in the structure as measured by the velocity or acceleration sensor 24 which is physically remote from the forcer 16 as illustrated. The adaptive vibration canceller 22 generates weighted sinusoidal force components which follow the harmonic frequencies of the shaft pulsation force 12. In the system described, the rotational speed w of the shaft 14 is measured by an optical or magnetic incremental encoder 26 which produces output pulses in synchronism with the rotation of the shaft 14. The output of the encoder 26 is harmonically related to the shaft pulsation force 12. Accordingly, shaft rotational speed w and force output 20 are related.

In the arrangement illustrated, a rotational harmonic generator 28 (FIGS. 1A and 1B) responsive to the encoder 26 produces various time base sinusoidal signals 29 at the fundamental rotational speed w of the shaft 14 and at harmonics thereof. The time base sinusoidal signals or outputs 29 of generator 28 are in the form: $e^{jkwt}$, where k is an integer 1, 2, 3 ... n and w is the speed of the shaft 14. The outputs of the generators 28 are used to generate weighted force component signals 30 in adaptive vibration canceller 22 at the various selected harmonics. The actuator 16 may thus be controlled by means of adaptive vibration canceller 22, encoder 26 and the generator 28 at the fundamental shaft rotation frequency and at various selected harmonics thereof. It is to be understood that because harmonic frequencies of the force components are based upon the encoder outputs, the weighted force components 30 follow the harmonic of the pulsation force or disturbance 12 as the shaft rotation speed varies.

Other vibration cancellation schemes based on FFT or time-domain methods would use the same time base, but would not generate the same sinusoidal waveforms. Any number of harmonics may be employed to produce the desired force components. For the purpose of this discussion, only the kth harmonic is illustrated it being understood that the sum of the various selected harmonics drive the actuator 16.

In the illustration (FIG. 1C), the disturbance or pulsation force 12 may be represented as a complex number in the form of A sin kwt and B cos kwt. A and B are unknown coefficients of a single complex number. The weighted force components 30 are signals which drive forcer 16 and are also represented in the form C sin and D cos where C and D are the weighted coefficients of a complex number. The values of C and D are varied to thereby control the response of the forcer 16. Sine and cosine components are supplied by the generator 28 at kth harmonic.

The entire structure 10 has a system dynamic characteristic 32 which is in the form of $G < \phi$, where G is the gain at the kth harmonic represented by the ratio of the accelerometer output 25 over the actuator input 30, and $\phi$ is the phase angle between the signals.

In the arrangement of FIG. 1C, the mechanical disturbance 12 is mechanically combined with the counteractive force 20 of the forcer 16 by interaction with the structure 10. The resulting physical acceleration E is detected by sensor 24 (e.g., an accelerometer). The output 25 of sensor 24 is coupled to adaptive vibration canceller 22 wherein it is multiplied at 36 and integrated over time at 34 in the preprocessor 40 by the kth harmonic from the generator 28. The outputs 38 are Fourier coefficients of E in the form of sin wt and cos wt and feed adaptive algorithm processor 42 which produces weighted components C and D. The components C and D are combined with the generator outputs to produce weighted force component outputs 30 for driving forcer 16.

In the arrangement described for one forcer 16 and one sensor 24, the adaptive algorithm processor 42 solves two linear equations for the two unknowns A and B which then determine the weighted values C and D. The combined weighted force component signals C sin kwt, D cos kwt, 30 drive the forcer 16 at the kth harmonic.

In the current harmonic (or Fourier series) based algorithm the sine and cosine waveforms at each harmonic frequency are multiplied by adaptively adjusted weights C and D and are then summed with the corresponding sines and cosines from the other harmonics to determine the controlled force 20 applied to the shaft 14 via the reaction mass actuator or forcer 16. The accelerometer measurement signal (which must be minimized in an adaptive vibration cancellation system) is resolved into its Fourier components by separately multiplying it by the sine or cosine of each harmonic frequency and integrating the product over an entire cycle of shaft rotation, obtaining two error signal Fourier coefficients at each harmonic frequency. The Fourier coefficients at a given frequency are then used to adjust the actuator adaptive weights at that same frequency, so as to minimize these error signal Fourier coefficients themselves.

As long as the mechanical vibrational system is linear, the adaptation process at one harmonic frequency will not interact with the adaptation at any other harmonic frequency. These operations for the kth harmonic summarized in FIG. 1C may thus be combined with other harmonics of interest.

The arrangement described more fully and in greater detail in the above-identified application is directed to a single forcer, single accelerometer system and does not address the problem of reducing vibrations at various locations in a complex structure. The problem is complicated by the fact that the number of actuators is usually fewer than the number of accelerometers. Also, to be most effective, actuators should be designed into the equipment and not merely added on. This greatly reduces the number of available actuator locations. Thus, the cost of such equipment is considerably increased for each actuator provided.

As a result, in a later co-pending application Ser. No. 551,691, filed Jul. 2, 1990 of the applicant, a multivariable adaptive vibration canceller was designed to minimize the total periodically induced vibratory disturbance in a structure having a unique dynamic structural characteristic, using a plurality of actuators and an equal or greater number of accelerometers where each actuator significantly interacts with each accelerometer to achieve the lowest possible resulting vibration in accordance with the structural characteristic. The disclosure of this second application is also incorporated herein by reference.

In the exemplary embodiment, the actuators are operated in response to complex input signals to produce counteractive forces in the structure. Accelerometers sense the combined structural response to the vibrational disturbance and the counteractive forces, and produce outputs indicative thereof. An adaptive algorithm processor which has an electrical characteristic related to the structural characteristic produces complex outputs for each actuator. The complex outputs are adjusted by the processor to result in a structural response to the combined disturbance and the actuator inputs which minimizes vibration energy at the accelerometer locations.

In the arrangement of this second application, which is illustrated in FIG. 2, a system 50 may be a complex structure upon which a disturbance 52 is imposed. As in the previously described arrangements, each input may be represented as a composite of sine and cosine components. For simplicity, however, each input is represented as a single line. Also, the sinusoidal time base outputs 29 of harmonic generator 28 (FIG. 1B) are applied as described in the first related patent application to provide the harmonic time base of the system.

In the system 50, a plurality of accelerometers or detectors 54 (1, 2, ... m) are placed at various locations to detect the motion or acceleration of the structure 50 at such points. A plurality of forcers or actuators 56 (1, 2, ... n), where $n<m$, interact with the structure 50 to impose counteractive forces 58 thereon as shown. The sum of the system responses to the disturbance 52 and the various forcer inputs 64(1) ... (64(n) is sensed by each of the accelerometers 54, each of which, in turn, produces a complex output 60 (1, 2, ... m). For each harmonic frequency of interest (in the case illustrated the kth harmonic), a multivariable adaptive vibration cancellation system or processor 62 produces weighted complex electrical outputs 64 which drive each of the forcers 56 such that the output 60 of accelerometers 54 outputs go to a minimum. Although not shown in detail, the weighted outputs 64'(l) ... 64'(n) from other processors for other harmonics bf interest may be combined with the outputs 64(1) ... 64(n) at the kth harmonic to drive forcer 56.

The physical system 50 has a dynamic system characteristic which may be determined by experimental means. For example, each forcer 56 may be activated one at a time by a complex input of a selected frequency while the physical system 50 is at rest. Outputs 60 of the various accelerometers 54 may be input to a spectrum analyzer such as a model 1172 Frequency Response Analyzer manufactured by Schlumberger, Inc. Each forcer 56, thereby produces a resulting vibration in the physical system which produces a corresponding measurable output at each accelerometer.

Each forcer 56 may be operated separately at the particular input frequency of interest and each accelerometer output 60 may be separately analyzed to compile a matrix of data for various frequencies and harmonics of such frequency. The various forcer inputs are selected in anticipation of the rotational speeds at which it is expected that the equipment will be operated. In the preferred embodiment, the equipment is not operated while the measurements are made. For each forcer input at a selected frequency of interest, the physical system can be represented by an m by n transfer function matrix [A] of complex numbers. When 2 forcers and 4 accelerometers are used a 4 by 2 matrix results.

The mechanical structure 50, as represented by the 4 by 2 matrix [A] of complex numbers of the kth harmonic relates the Fourier input coefficients of the forcers 56 (1, 2, ... n) to the Fourier output coefficients of the accelerometers 54 (1, 2, ... m). During operation, each accelerometer 54 measures the vibrational disturbance 52 at its location as well as the effect of each forcer 56 at such location, so that the m, kth harmonic accelerometer Fourier output coefficients 60 (1, 2, ... m) may be combined as a multivariable adaptive vibration cancellation complex vector E. The values of E are processed in the adaptive vibration cancellation processor 62 to produce the forcer inputs 64 by means of a matrix algebra algorithm. E represents the error signal (algebraic sum) or difference between the disturbance and all the counteractive forces on the structure 50.

In accordance with this earlier invention, the components of the complex numbers of the transfer function matrix [A] are known for all harmonic frequencies at which vibration cancellation is to occur. Because shaft rotation speed can change, a frequency response matrix is generated over a wide range of frequencies of interest for the mechanical structure with respect to the forcer and accelerometer locations as noted above. Further, because the mechanical structure is complicated, there is a significant interaction between every forcer and every accelerometer. Accordingly, the adaptive vibration canceller 62 must use all four accelerometer output signals 60 to obtain the two forcer signals 64 in a single coordinated multi-input, multi-output algorithm.

The kth harmonic relation between the forcers 56, the accelerometers 54, the disturbance 52 and the physical system 50 may be summarized by the following expression:

$$E = b - Ax \quad [1]$$

Where E is the vector of four complex numbers which are the kth harmonic Fourier coefficients of the four accelerometers 54; b is the vector of the coefficients representing the vibrational disturbance 52 acting on the four accelerometers 54 which is an unknown vector input; [A] is the complex 4 by 2 physical system transfer function matrix; and x is the vector of two forcer Fourier coefficients. The terms on the right hand side of the expression, namely, b and Ax, express the two sources of vibration measured by the accelerometers, namely, the vibrational disturbance b which is unknown and the forcer motion Ax which is established by the algorithm processor output. The expression E is the total vibration energy at the accelerometer locations. It is intended that the magnitude of the accelerometer vector E should be minimized by employing a sum of the squares operation on the accelerometer coefficients.

A variety of mathematical processes may be employed to achieve the desired minimization of the vector. However, in the preferred embodiment the vector of forcer signals 64 which act to minimize the magnitude of the accelerometer vector E are resolved by solving the so called normal equations for x using the equation:

$$A^{*T}(b - Ax) = 0 \quad [2]$$

where $[A^{*T}]$ is a 2 by 4 matrix, known as a complex conjugate transpose of [A].

At the frequency of the kth harmonic, the matrix [A] is empirically determined. Matrix $[A^{*T}]$ is determined by the mathematical transposition. Once the harmonic is known, the forcer vector x can be determined, because the output of the adaptive vibration cancellation processor 62 is thus specified by mathematical operation. Although the vector b representing the disturbance is not known, the vector $E = b - Ax$ is measured directly by the accelerometers.

In FIG. 2, the adaptive vibration cancellation processor 62 includes processing matrix 68 which effects the complex conjugate transpose of A. The $A^{*t}$ values or instantaneous forcer inputs are separately processed in respective integrators 70 (1, 2, ... n) in order to produce values 64 (1, 2, ... n) which are solutions for x of equation [2] obtained through complex vector matrix integral equations described in the second application. The harmonic generator time base sinusoidal outputs 29 combine with integrators 70 to produce the complex solution. The discrete time equivalent of integration must be used for the integrators since the accelerometer Fourier coefficients are updated at the end of each cycle of shaft rotation.

In order to minimize vibration, the adaptive vibration cancellation processor 62 must produce values of x which converge to a solution of the normal equation [2]. From the foregoing, it can be recognized that knowledge of the transfer function [A] of the physical system must be available to utilize the adaptive vibration canceller of applicant's second application. On the other hand, circumstances exist where such information is not available or is not easily obtained.

SUMMARY OF THE INVENTION

In view of the foregoing, it is the primary object of the present invention to provide an improved adaptive vibration canceller system by which it is possible to minimize vibration in a mechanical structure for which there are many forcers and accelerometers, and the transfer function of the physical system is unknown.

Another object of the invention is to provide an improved vibration canceller system which is applicable to a wide range of specific applications utilizing various types and numbers of forcers and sensors;

It is a further object to provide an improvement in adaptive vibration cancelling systems for physical systems in the form of mechanical structures having a rotary shaft.

In accordance with the present invention, this object is achieved by utilizing an adaption period to determine the effect of variation of the forcer vector on the error signal output from the accelerometers. The observed change in the size and direction of change in the error signal is then utilized to determine the nominal value of the forcer vector for use in a vector difference equation of the present invention, by which the adjustment of the forcers for the next cycle is performed. By repeating such operations, the adjustments produce a convergence of the effects toward the minimum total vibration for the mechanical structure without any knowledge of its transfer function.

The further objects, details and advantages of the present invention will become more apparent from the following detailed description when viewed in conjunction with the accompanying drawings.

DETAILED DESCRIPTION OF THE PREFERRED EMBODIMENT

Figure 2:
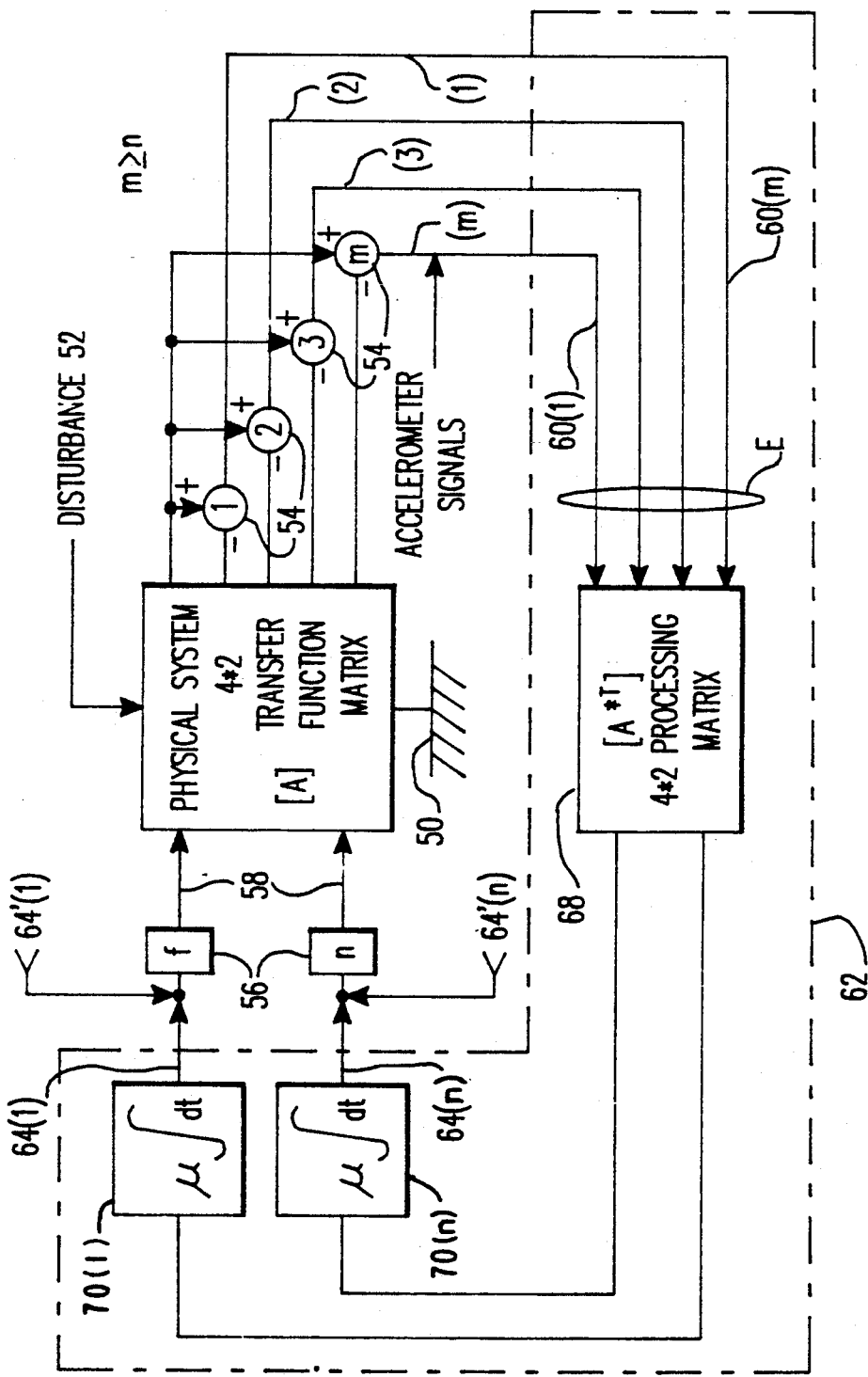
FIG. 2 is an electrical block diagram of a multivariable adaptive vibration canceller of a second related application of the applicant.

As noted above, the kth harmonic relation between the forcers, the accelerometers, the disturbance, and the physical system shown in FIG. 2 can be summarized by equation [1] where E is (for the system shown in FIG. 2) the vector of four complex numbers which are the kth harmonic Fourier coefficients of the four accelerometers, b is the vector of four coefficients showing the vibrational disturbance 52 acting on the four accelerometers 54 (the value of this vector is unknown), A is the complex 4×2 physical system transfer function matrix, and x is the vector of two forcer Fourier coefficients. The two terms on the right-hand side of equation [1], b and Ax, express the two sources of vibration measured by the accelerometers: b, the vibrational disturbance, and Ax, the forcer motion. In the FIG. 2 system, the magnitude of the accelerometer vector E is minimized by performing a sum of the squares operation on the accelerometer coefficients using a mathematical process requiring knowledge of the transfer function [A].

However, in the present case, instead of requiring such knowledge, use is made of the more basic fact that minimizing the magnitude of the accelerometer vector E is the same as minimizing the sum of the squares of the accelerometer coefficients, and is, thus, the same as minimizing the total vibration energy at the accelerometer locations. That is the sum of the squares of the accelerometer coefficients, which is also the squared-magnitude of the accelerometer error vector, can from equation [1] be expressed as:

$$E^2(x) = E^H E = b^H b - 2b^H A x + x^H A^H A x \quad [3]$$

where H denotes the Hermitian (complex conjugate transpose) of b, A, x, or E. $A^H$ is (in a two forcer, four accelerometer example) a 2×4 matrix.

For the improved vibration canceller, the matrix A does not have to be known. Once it is decided upon, the forcer vector x can be known, because it is the output of the vibration canceller control processor 71, and is, thus, specified by its control algorithm 72. Although the vector of disturbance b is not known, the error vector $E = b - Ax$ is measured directly by the accelerometers and can be used to form the squared-error $E^2(x)$, which is to be minimized.

As can be seen from equation [3], $E^2(x)$ is a quadratic function of the forcer vector x and so can be visualized as a paraboloidal surface in a higher-dimensional space of forcer coefficients. Since it is a quadratic function of x, the surface $E^2(x)$ has only one local minimum with respect to x, and this local minimum is also the global minimum. This means that an algorithm that incrementally adjusts x to produce incremental decreases in $E^2$, will not get trapped on a local minimum that is different than the global minimum.

Since the system's transfer function matrix [A] is not known, measurement of $E^2(x)$ at a single operating point is not enough information with which to determine which way the forcer vector x should be adjusted to decrease $E^2(x)$. To decide the correct direction of adjustment, an adaptation period which consists of two shaft rotation cycles is used. During the first shaft rotation, the forcer vector is held at the current nominal value x, and the accelerometers' squared-error $E^2(X)$ is measured. During the second shaft rotation, the forcer vector x is perturbed by a zero-mean random vector u with a diagonal covariance of $\sigma^2 I$ and the squared-error $E^2(x+u)$ is measured, where I is the unit or identity matrix. The size and the direction of the change in $E^2$ observed during the current adaptation period will determine the nominal value of x for the next adaptation period, according to the following vector difference equation which is the subject of the present disclosure:

$$x_{j+1} = x_j + \beta [E^2(x_j) - E^2(x_j + u_j)] u_j \quad [4]$$

where $x_j$ is the nominal value of the forcer vector during the current adaptation period j, $x_{j+1}$ is the nominal value of the forcer vector for the next adaptation period j+1, $E^2(\ )$ is the square of the accelerometer vector measured with either the perturbed $(x_j + u_j)$ or unperturbed $(x_j)$ forcer vector, $u_j$ is the jth sample of a random vector (i.e., $u_j$ is composed of a pair of complex numbers in a two-forcer example) with covariance $\sigma^2 I$, where I is the unit or identity matrix, and $\beta$ is a positive constant used to control the speed of adjustment of x. The use of this algorithm to minimize the vibration energy at the accelerometers is shown in FIG. 3.

From equation 4, if $E^2$ decreases when $u_j$ is added to the forcer vector, then the nominal value of the forcer vector x is changed in the direction of $u_j$. If $E^2$ increases when $u_j$ is added, then x is changed in the direction opposite to $u_j$. The change in the nominal value of x will, in either case, continue to reduce the acceleration energy $E^2$ until the unique local and global minimum-acceleration condition is reached, all without any knowledge or use of the mechanical structure's transfer function matrix [A].

Figure 3:
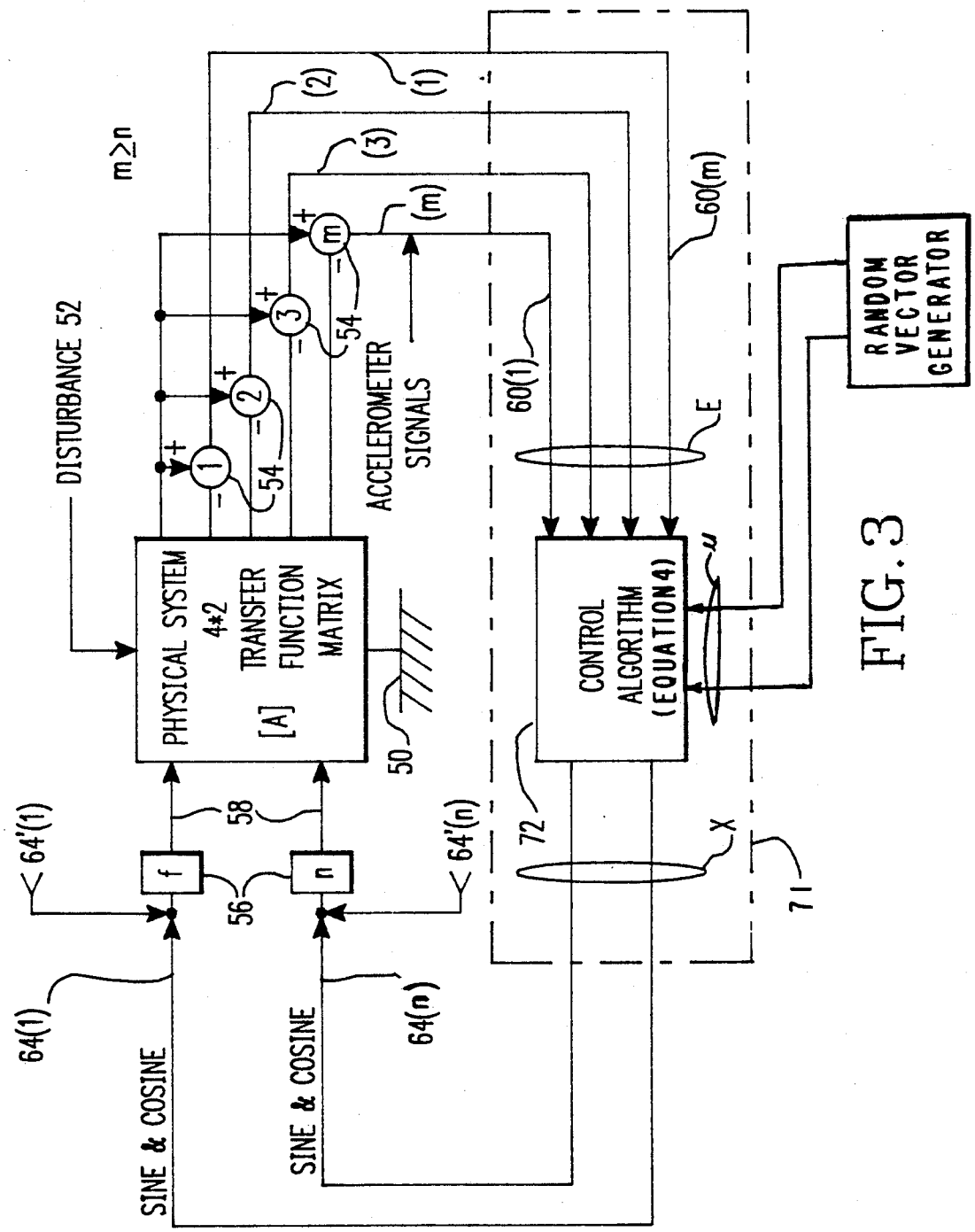
FIG. 3 is an electrical block diagram of an improved adaptive vibration canceller in accordance with the present invention.

This means that the improved vibration canceller shown in FIG. 3, with the processing control algorithm given in equation [4], will minimize the vibration energy measured at the accelerometers.

Figure 1A:
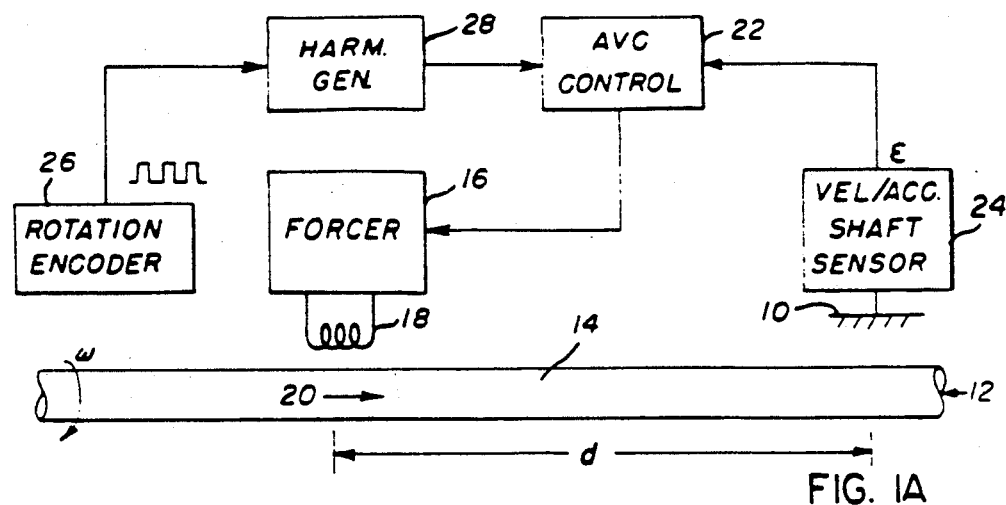
FIG. 1A is a system block diagram of a first related application of the applicant.
Figure 1B:
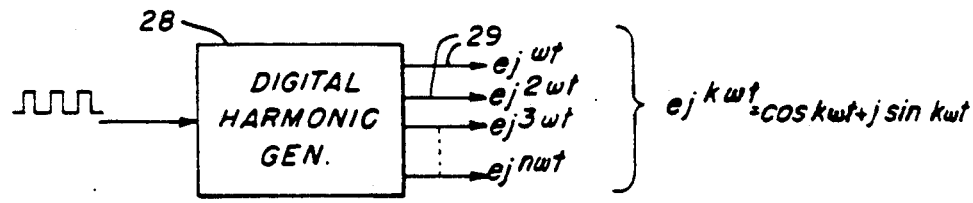
FIG. 1B is an electrical block diagram of a harmonic generator of the FIG. 1A system.
Figure 1C:
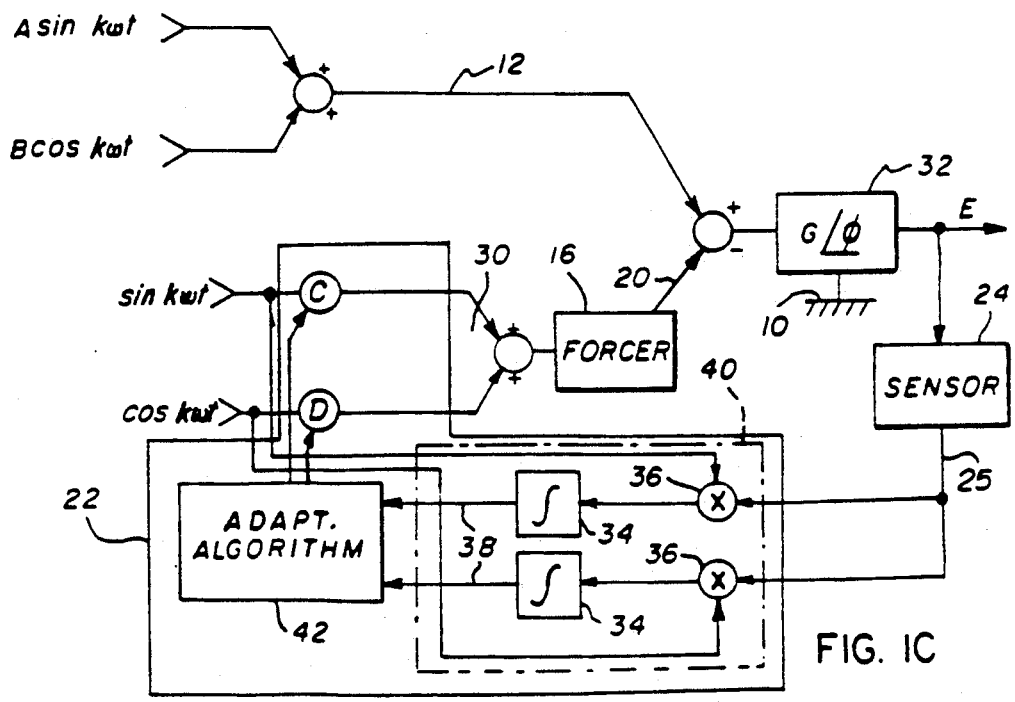
FIG. 1C is an electrical block diagram of the basic adaptive vibration canceller of FIG. 1A.

For completeness, it should be recognized that the value of $E^2$ in equation [4] is a scalar despite the complex nature of the outputs from the accelerometer sensors 54 and despite the complex nature of the inputs to the forcers 56. That is, for each accelerometer output a sine and cosine multiplication and integration is performed in the manner described above relative to FIG. 1C at 36, 34, respectively. In processor 71, each of these output values is multiplied by its own complex conjugate, and then all of these values are summed with this sum used as the $E^2$ in the control algorithm. Also, with regard to the outputs x to each forcer 56, while shown in FIG. 3 as a single line, as reflected by the sine and cosine labels, each output, in the manner described relative to applicant's first related application, is multiplied by sine and cosine weighting components produced by the harmonic generator 28 before being utilized to drive the respective forcer 56.

From the foregoing, it should now be apparent how the disclosed improved vibration canceller of the present invention is capable of minimizing vibration in a mechanical structure for which there are (a) many forcers and many accelerometers and (b) no knowledge of the mechanical structure's transfer function.

It should be appreciated that the above described preferred embodiment of the invention is merely exemplary in nature, and various modifications and changes will be apparent to those of ordinary skill in the art. Thus, the invention should not be considered as being limited to those aspects specifically mentioned and, instead, includes all modifications, alterations, variations, and changes as are encompassed by the scope of the appended claims.

I claim:

1. A multivariable adaptive vibration canceller for cancelling periodically induced vibration in a mechanical structure comprising:
   a plurality of actuators operatively coupled to the structure for producing a counteracting vibration therein in response to a complex input signal for each actuator, the structure having a dynamic structural system characteristic in the form of a matrix of system responses to vibrational inputs at selected harmonics of interest;
   a plurality of sensors, at least equal to the number of actuators coupled to the structure for sensing periodically induced vibration and actuator induced vibration, said sensors producing a complex output representative of the algebraic sum of the vibrations sensed thereby for each harmonic;
   multivariable adaptive vibration cancellation processor means responsive to complex outputs of the sensors for producing the complex inputs to the actuators, said vibration cancellation processor means producing said inputs on the basis of an adaptation cycle wherein the effect of an adjustment of said complex inputs on said complex outputs is utilized to determine the nature of a successive adjustment of the complex inputs independent of knowledge of said dynamic structural system characteristic.

2. A multivariable adaptive vibration canceller according to claim 1, wherein said cancellation processor means includes means for performing a control algorithm to determine the complex input, said control algorithm being:

$$x_{j+1} = x_j + \beta[E^2(x_j) - E^2(x_j + u_j)]u_j$$

where $x_j$ is a nominal value of the complex input during a current adaptation cycle j, $x_{j+1}$ is the nominal value of the complex input vector for the next adaptation cycle j+1, $E^2(\ )$ is the square of the complex output measured with a perturbed $(x_j + u_j)$ and an unperturbed $(x_j)$ complex input, $u_j$ is the jth sample of a random vector with covariance $\sigma^2 I$, and $\beta$ is a positive constant used to control the speed of adjustment of x.

3. A multivariable adaptive vibration canceller according to claim 1, wherein the vibration canceller processor means changes the value of $x_{j+1}$ in the direction of $u_j$ when a decrease in $E^2$ occurs in response to adding of $u_j$ to the complex input $x_j$, and changes $x_{j+1}$ in a direction opposite to $u_j$ when $E^2$ increases in response to adding of $u_j$ to the complex input $x_j$.

4. A multivariable adaptive vibration canceller according to claim 3, wherein said structure includes a rotating shaft.

5. A multivariable adaptive vibration canceller according to claim 2, wherein said structure includes a rotating shaft.

6. A multivariable adaptive vibration canceller according to claim 1, wherein said structure includes a rotating shaft.

7. A multivariable adaptive vibration canceller according to claim 1, wherein said sensors comprise accelerometers.

8. A multivariable adaptive vibration canceller according to claim 2, wherein said sensors comprise accelerometers.

9. A multivariable adaptive vibration canceller according to claim 3, wherein said sensors comprise accelerometers.

10. A multivariable adaptive vibration canceller according to claim 4, wherein said sensors comprise accelerometers.

11. A multivariable adaptive vibration canceller according to claim 6, wherein said sensors comprise accelerometers.

12. A method for adaptively cancelling periodically induced vibration in a mechanical structure comprising the steps of:
    sensing periodically induced vibration utilizing a plurality of sensors and producing a complex output representative of the algebraic sum of the vibrations sensed thereby for each harmonic;
    counteracting said vibration with a plurality of actuators operatively coupled to the structure by producing a counteracting vibration therein in response to a complex input signal for each actuator in the form of a matrix of system responses to vibrational inputs at selected harmonics of interest;
    producing the complex inputs for the actuators on the basis of an adaptation cycle wherein the effect of an adjustment of said complex inputs on said complex outputs is utilized to determine the nature of a successive adjustment of the complex inputs independent of knowledge of a dynamic structural system characteristic of the mechanical structure in the form of a matrix of system responses to known vibrational inputs at the selected harmonics of interest.

13. A method for cancelling vibration according to claim 12, wherein said step of producing the complex inputs on the basis of an adaptation cycle is performed utilizing a control algorithm to determine the complex input, said control algorithm being:

$$x_{j+1} = x_j + \beta[E^2(x_j) - E^2(x_j + u_j)]u_j$$

where $x_j$ is a nominal value of the complex input during a current adaptation cycle j, $x_{j+1}$ is the nominal value of the complex input vector for the next adaptation cycle j+1, $E^2(\ )$ is the square of the complex output measured with a perturbed $(x_j + u_j)$ and an unperturbed $(x_j)$ complex input, $u_j$ is the jth sample of a random vector with covariance $\sigma^2 I$, and $\beta$ is a positive constant used to control the speed of adjustment of x.

14. A method for cancelling vibration according to claim 13, wherein the value of $x_{j+1}$ is changed in the direction of $u_j$ when a decrease in $E^2$ occurs in response to adding of $u_j$ to the complex input $x_j$, and the value of $x_{j+1}$ is changed in a direction opposite to $u_j$ when $E^2$ increases in response to adding of $u_j$ to the complex input $x_j$.

* * * * *